(12) United States Patent
Palmer et al.

(10) Patent No.: US 11,366,823 B2
(45) Date of Patent: Jun. 21, 2022

(54) METHOD AND SYSTEM FOR TRANSFORMING AND DELIVERING DIGITAL ASSETS OVER A NETWORK

(71) Applicant: Unity Technologies SF, San Francisco, CA (US)

(72) Inventors: Stephen Joseph Palmer, Round Rock, TX (US); Matt Van Gorder, Austin, TX (US)

(73) Assignee: Unity Technologies SF, San Francisco, CA (US)

( * ) Notice: Subject to any disclaimer, the term of this patent is extended or adjusted under 35 U.S.C. 154(b) by 53 days.

(21) Appl. No.: 16/818,952

(22) Filed: Mar. 13, 2020

(65) Prior Publication Data

US 2020/0293544 A1 Sep. 17, 2020

Related U.S. Application Data

(60) Provisional application No. 62/819,208, filed on Mar. 15, 2019.

(51) Int. Cl.
| | |
|---|---|
| *G06F 16/25* | (2019.01) |
| *G06F 16/11* | (2019.01) |
| *H04L 67/568* | (2022.01) |
| *H04L 67/01* | (2022.01) |
| *H04L 67/60* | (2022.01) |
| *G06Q 20/12* | (2012.01) |
| *H04L 67/565* | (2022.01) |

(52) U.S. Cl.
CPC .......... *G06F 16/258* (2019.01); *G06F 16/128* (2019.01); *H04L 67/2842* (2013.01); *H04L 67/32* (2013.01); *H04L 67/42* (2013.01); *G06Q 20/123* (2013.01); *H04L 67/2823* (2013.01)

(58) Field of Classification Search
CPC ............ H04L 65/4084; H04L 67/2823; H04L 67/2842; H04L 67/2847; H04L 67/32; H04L 67/42; G06F 16/258; G06F 16/128
See application file for complete search history.

(56) References Cited

U.S. PATENT DOCUMENTS

| | | | | |
|---|---|---|---|---|
| 8,078,760 | B2 * | 12/2011 | King | H04L 67/06 709/246 |
| 8,693,838 | B1 * | 4/2014 | Aldrey | H04N 21/632 386/200 |
| 8,856,079 | B1 * | 10/2014 | Subramanian | G06F 16/289 707/649 |
| 9,158,828 | B1 * | 10/2015 | Britton | G06F 16/27 |

(Continued)

*Primary Examiner* — Shean Tokuta
(74) *Attorney, Agent, or Firm* — Schwegman Lundberg & Woessner, P.A.

(57) ABSTRACT

Methods and systems for transforming and delivering a digital asset are disclosed. A request is received from an application client incorporated into a memory on one of the one or more user devices and being executed by the one or more processors. The request includes a request for the digital asset and specifies a data format for the digital asset. Source data associated with the requested digital asset is located. The source data describes the digital asset. The source data is transformed in substantially real-time. The transforming includes modifying the source data into a data format consistent with the data format specified in the request. The transformed data is sent to the user device for use in the application client.

18 Claims, 9 Drawing Sheets

(56) References Cited

U.S. PATENT DOCUMENTS

| | | | |
|---|---|---|---|
| 9,218,252 B1* | 12/2015 | Revur | G06F 16/27 |
| 9,583,140 B1* | 2/2017 | Rady | H04N 21/44016 |
| 9,710,307 B1* | 7/2017 | Corley | G06F 9/4843 |
| 11,032,156 B1* | 6/2021 | Jain | H04L 67/1095 |
| 2006/0100978 A1* | 5/2006 | Heller | G06F 16/258 |
| 2006/0259386 A1* | 11/2006 | Knowlton | G06F 8/30 705/35 |
| 2007/0220024 A1* | 9/2007 | Putterman | H04N 21/43615 |
| 2008/0170622 A1* | 7/2008 | Gordon | H04N 21/4348 375/240.18 |
| 2008/0263610 A1* | 10/2008 | Murray | G06F 16/40 725/110 |
| 2010/0250773 A1* | 9/2010 | Mao | H04L 67/1095 709/231 |
| 2010/0325153 A1* | 12/2010 | Thakkar | H04L 12/2812 707/770 |
| 2011/0235991 A1* | 9/2011 | Luthra | H04N 21/4147 386/232 |
| 2012/0230438 A1* | 9/2012 | Shrum, Jr | H04N 19/30 375/240.26 |
| 2012/0254456 A1* | 10/2012 | Visharam | H04N 21/2343 709/231 |
| 2013/0198335 A1* | 8/2013 | Goel | H04N 21/234336 709/219 |
| 2013/0238562 A1* | 9/2013 | Kumarasamy | G06F 9/45558 707/649 |
| 2014/0108351 A1* | 4/2014 | Nallathambi | G06F 11/1464 707/639 |
| 2014/0244849 A1* | 8/2014 | Rizzo | H04L 65/602 709/226 |
| 2016/0134881 A1* | 5/2016 | Wang | H04L 65/607 375/240.02 |
| 2017/0270104 A1* | 9/2017 | Alshikh | G06F 40/58 |
| 2017/0354878 A1* | 12/2017 | Posin | A63F 13/352 |
| 2017/0358051 A1* | 12/2017 | Heynen | G06F 9/54 |
| 2018/0302660 A1* | 10/2018 | Olechowski | H04N 21/234309 |
| 2019/0069004 A1* | 2/2019 | Badawiyeh | H04N 21/44016 |
| 2020/0226233 A1* | 7/2020 | Penugonda | G06F 21/64 |
| 2020/0293544 A1* | 9/2020 | Palmer | G06F 8/41 |
| 2021/0149973 A1* | 5/2021 | Gupta | G06F 16/9577 |

* cited by examiner

METHOD AND SYSTEM FOR TRANSFORMING AND DELIVERING DIGITAL ASSETS OVER A NETWORK

CROSS-REFERENCE TO RELATED APPLICATIONS

This application claims the benefit of priority under 35 U.S.C. § 119(e) to U.S. Provisional Patent Application Ser. No. 62/819,208, filed on Mar. 15, 2019, which is incorporated by reference herein in its entirety.

TECHNICAL FIELD

The subject matter disclosed herein generally relates to the technical field of computer systems and, in one specific example, to computer systems and methods for delivering (e.g., streaming and downloading) digital assets over a network.

BACKGROUND OF THE INVENTION

Various tools exist to allow users to download content over a network for an application client. The application client may typically be either a game or a mobile application. The downloaded content is typically referred to as downloadable content, or DLC. Existing DLC technology requires target content to be ready for consumption and stored on a content server prior to an application client attempting to download it. To be ready for consumption, the target content must be in a format that is acceptable for the application client. For example, the format might be specific to an application client type or version, or an operating system (Windows™ OS, Apple™ iOS, Unix OS, or the like), or a device type (XBox™, PS4™, or the like). Downloadable content on the content server is created in advance (e.g., prior to the application client requesting it), and created for a given specific target specification (e.g., a specific device, operating system, application client, and more). In order to create the downloadable content in advance, a list is created which describes a set of target devices and client specifications that are to be supported. Then, based on the list of target devices and specifications, all permutations of the source content needed to support the predetermined target devices and specifications are generated.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
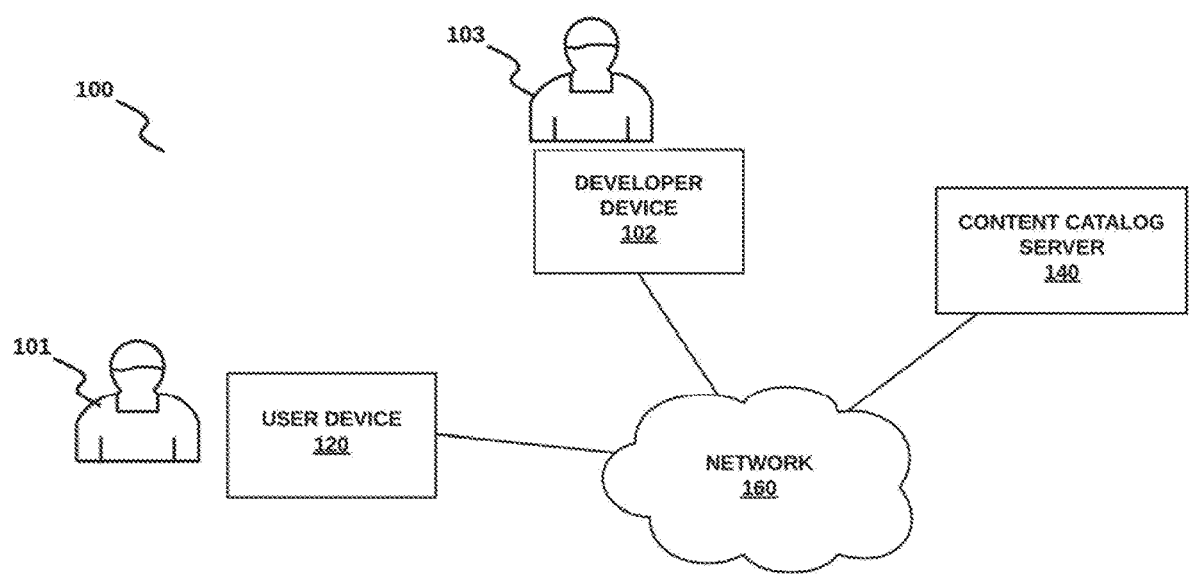
FIG. 1A is a schematic illustrating an asset transform and delivering system, in accordance with one embodiment.

The description that follows describes systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The term 'digital content' or just 'content' used throughout the description herein should be understood to include all forms of media including pictures, videos, audio, text, 3d models (including textures, materials, meshes, and more), animations, vector graphics, digital objects, and the like.

The term 'environment' used throughout the description herein is understood to include 2D digital environments (e.g., 2D video game environments, 2D simulation environments, 2D content creation environments), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein is understood to include any digital object or digital element within an environment. A digital object can represent almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A digital object includes data (e.g., asset data as described below) that describes properties and behavior for the digital object.

The terms 'asset' and 'digital asset', used throughout the description herein are understood to include any data that can be used to define a digital object or any data that can be used to define an aspect of a digital project (e.g., including: a game, a film, a software application). For example, an asset can include data for an image, a 3D model (textures, rigging, and the like), an audio sound, a video, an animation, a 3D mesh and the like. The data describing an asset may be stored within a file, and may be contained within a collection of files, and may be compressed and stored in one file (e.g., a compressed file), and may be stored within a memory.

The terms 'client' and 'application client' used throughout the description herein are understood to include a software client or software application that accesses data and services on a server, including accessing the server over a network.

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or played by an artificial intelligence agent.

Operations for transforming and delivering a digital asset are disclosed. A request is received from an application client incorporated into a memory on one of the one or more user devices and being executed by the one or more processors. The request includes a request for the digital asset and specifies a data format for the digital asset. Source data associated with the requested digital asset is located. The source data describes the digital asset. The source data is transformed in substantially real-time. The transforming includes modifying the source data into a data format consistent with the data format specified in the request. The transformed data is sent to the user device for use in the application client.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations. In example embodiments, systems and methods are provided for transforming source data into a target data format in the cloud on demand (e.g., on request and in substantially real-time) and to publish the transformed data for consumption by one or more application clients. In accordance with an embodiment, the systems and methods described herein transform digital asset data from a first data format to a second data format in the cloud and then communicates (e.g., streams, downloads, or the like) the output data on demand to any client device over a network.

The systems and methods described herein include one or more components or operations that are non-routine or unconventional individually or when combined with one or more additional components or operations, because, for example, they provide a number of valuable technological benefits to software developers: first, the systems and methods described herein simplify multi-platform and multi-device development and deployment of software applications in part because development of assets and release of assets for software clients can be separate from the development and release of software clients that use the assets. The systems and methods described herein can support target device capabilities and requirements not envisioned during development of an application (e.g., at a product release time), and without requiring changes to code running on a target device. For example, consider a video game software application targeting a first specific device (e.g., Xbox One™) which has a specified display graphic resolution, and also the same video game software application (e.g., same game code) targeting a second specific device (e.g., Xbox One X™) at a later time which has a specified display graphic resolution which is different from the first specific device. Using the systems and methods described herein, the same game code may be used with substantially higher resolution assets. Second, the systems and methods described herein accelerate development of software applications by allowing the transformation of source asset data (e.g., into runtime asset data) to happen in the cloud. Third, the systems and methods described herein minimize application client installation and loading times for end users by delivering assets when they are needed on demand rather than including them (e.g., packaged) within the application client. Fourth, the systems and methods described herein enable small application clients to access massive amounts of digital content data.

Turning now to the drawings, systems and methods for transforming and delivering digital assets over a network in accordance with embodiments of the invention are illustrated, including one or more components or operations that are non-routine or unconventional individually or a combination of components and operations that is non-routine or unconventional. In accordance with an embodiment and shown in FIG. 1A is a diagram of an example asset transforming and delivering system 100 and associated devices configured to transform asset source data from a source data format into a target data format in the cloud (e.g., on a server) on demand and to publish the transformed data for consumption by one or more application clients executing on a user device. In example embodiments, the source data format is a data format in which an asset was created or a data format for an asset on a content server, and the target data format is a data format specific to a target application client and a device running the target application client (e.g., including properties of the application client such as location (including location based regulatory requirements), graphical preferences, target age group for users, subscriber level, and more) as well as properties of the device). In example embodiments, the asset transforming and delivering system 100 includes a user device 120 operated by a user 101 (e.g., a game player, a film viewer, and more), a developer device 102 operated by a developer 103 (e.g., game creator, film creator, and more), and a content catalog server 140 all coupled in networked communication via a network 160 (e.g., a cellular network, a Wi-Fi network, the Internet, a wired local network, and the like).

Although not separately shown in FIG. 1A, during operation (e.g., while executing operations described with respect to FIG. 2A, FIG. 2B, and FIG. 3), the system 100 may have a plurality of user devices 120 connected to the network 160. Similarly, although not separately shown in FIG. 1A, during operation (e.g., while executing operations described with respect to FIG. 2A, FIG. 2B, and FIG. 3), the system 100 may have a plurality of content catalog servers 140 connected to the network 160. Furthermore, although not separately shown in FIG. 1A, during operation (e.g., while executing operations described with respect to FIG. 2A, FIG. 2B, and FIG. 3), the system 100 may have a plurality of developer devices 102 connected to the network 160.

Figure 1B:
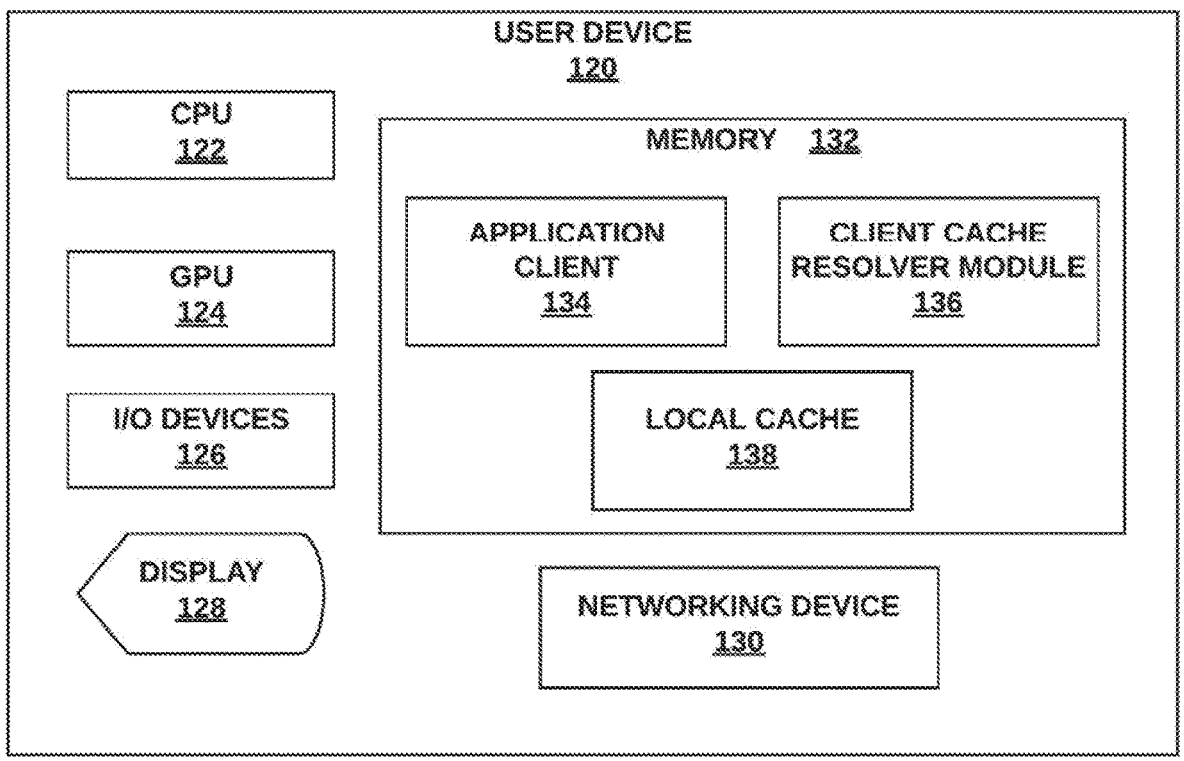
FIG. 1B is a schematic illustrating a user device within an asset transform and delivering system, in accordance with one embodiment.

In accordance with example embodiments, and shown in FIG. 1B, the user device 120 is a computing device capable of providing an application client experience (e.g., video game, film content, kiosk presentation) to the user 101. In some embodiments, the user device 120 is a mobile computing device, such as a smartphone or a tablet computer and in other embodiments the user device 120 is a desktop computer or video game console, in still other embodiments, the user device 120 is a kiosk presentation booth or a movie theater projection system. The application client can include any type of interactive or non-interactive software application, including 2 dimensional (2D) applications, 3-dimensional (3D) applications, virtual reality (VR) applications, augmented reality (AR) applications and the like (e.g., including video games, mobile applications, kiosk presentation applications, film presentation applications, and the like).

In the example embodiment, the user device 120 includes one or more central processing units (CPUs) 122, and graphics processing units (GPUs) 124. The CPU 122 is any type of processor, processor assembly comprising multiple processing elements (not shown), having access to a memory 132 to retrieve instructions stored thereon, and execute such instructions. Upon execution of such instructions, the instructions implement the CPU 122 to perform a series of tasks or operations as described below in reference to FIG. 2A, FIG. 2B and FIG. 3. The user device 120 also includes one or more networking devices 130 (e.g., wired or wireless network adapters) for communicating across the network 160. In accordance with an embodiment, the user device 120 also includes one or more input devices 126 such as, for example, a keyboard or keypad, mouse, joystick (or other game play device), pointing device, touch screen, or handheld device (e.g., hand motion tracking device). The user device 120 further includes one or more display devices 128 for displaying an output of the application client 134, such as a laptop display, touchscreen of a tablet or smartphone, kiosk display screen, or the like. In accordance with an embodiment, the display device may be a projection device which projects a display onto an external surface (e.g., such as a movie theater screen. In accordance with an embodiment, the display device 128 may include one or more lenses or a visor of a VR or AR head mounted display (HMD), which may be configured to display virtual objects to the user 101 in conjunction with a real-world view. The display device 124 may be driven or controlled by the one or more GPUs 124. In accordance with an embodiment, the GPU 124 processes aspects of graphical output that assists in speeding up rendering of output through the display device 128.

The user device 120 also includes a memory 132 configured to store an application client (e.g., executed by the CPU 122 or GPU 124) that communicates with the display device 128 and also with other hardware such as the input/output device(s) 126 to present an application (e.g., a video game, film content, kiosk presentation) to the user 101. The memory 132 can be any type of memory device, such as random access memory, read only or rewritable memory, internal processor caches, and the like. In accordance with an embodiment, the memory 132 may also include a client cache resolver module 136 and a local cache 138 that provide various functionality as described herein. Each of the application client 134 and the client cache resolver module 136 include computer-executable instructions residing in the memory 132 that are executed by the CPU 122 or the GPU 124 during operation. The client cache resolver module 136 may be integrated directly within the application client 134, or may be implemented as a separate piece of software (e.g., a plug-in).

Figure 1C:
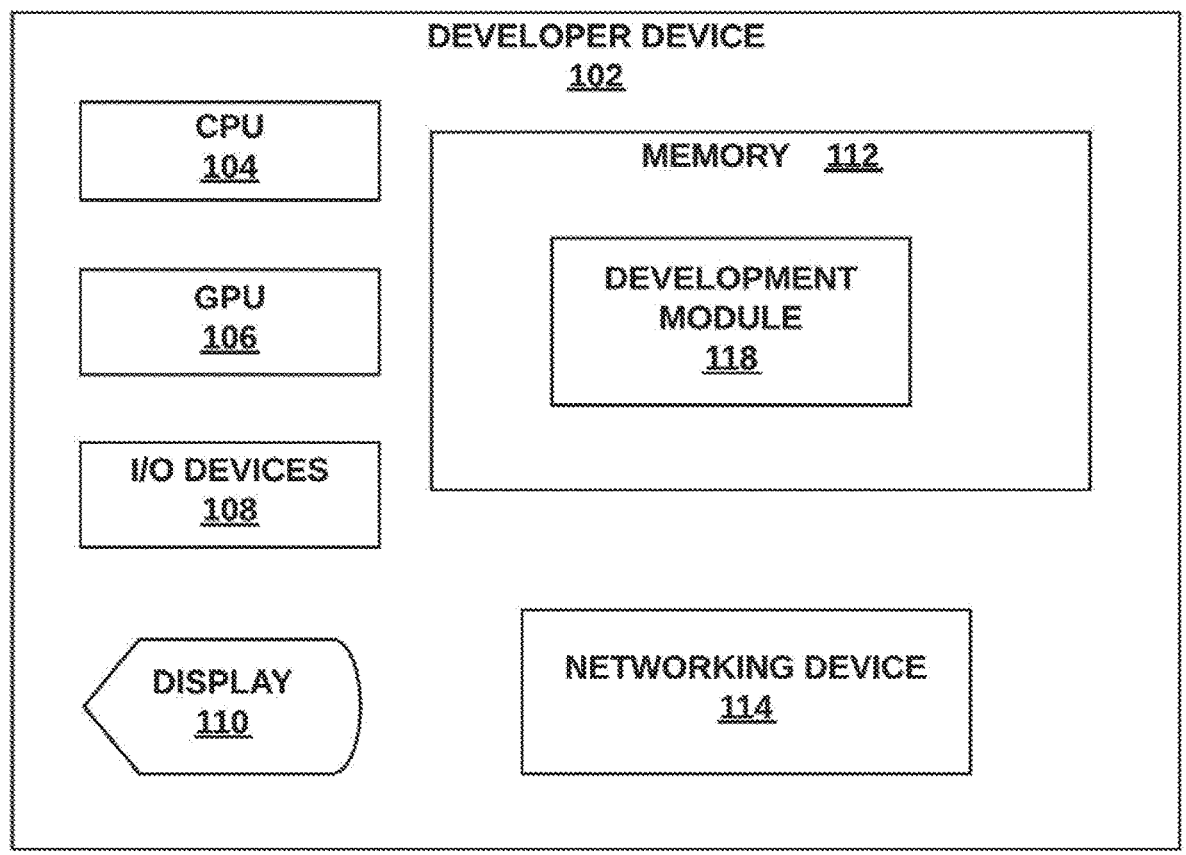
FIG. 1C is a schematic illustrating a developer device within an asset transform and delivering system, in accordance with one embodiment.

In accordance with example embodiments, and shown in FIG. 1C, the developer device 102 is a computing device capable of providing a development environment (e.g., integrated development environment for software development) to the developer 103. In some embodiments, the developer device 102 is a mobile computing device, such as a smartphone or a tablet computer and in other embodiments the developer device 102 is a desktop or laptop computer.

In accordance with an example embodiment, the developer device 102 includes one or more central processing units (CPUs) 104, and graphics processing units (GPUs) 106. The CPU 104 is any type of processor, processor assembly comprising multiple processing elements (not shown), having access to a memory 112 to retrieve instructions stored thereon, and execute such instructions. Upon execution of such instructions, the instructions implement the CPU 104 to perform a series of tasks as described below in reference to FIG. 2A, FIG. 2B and FIG. 3. The developer device 102 also includes one or more networking devices 114 (e.g., wired or wireless network adapters) for communicating across the network 160. The developer device 102 also includes one or more input devices 108 such as, for example, a keyboard or keypad, mouse, joystick (or other game play device), pointing device, touch screen, or handheld device (e.g., hand motion tracking device). The developer device 102 further includes one or more display devices 110, such as a laptop display, touchscreen of a tablet or smartphone, or lenses or visor of a VR or AR head mounted display (HMD), which may be configured to display virtual objects to the developer 103 in conjunction with a real-world view. The display device 110 is driven or controlled by the one or more GPUs 106. The GPU 106 processes aspects of graphical output that assists in speeding up rendering of output through the display device 110.

The developer device 102 also includes a memory 112 configured to store a development module 118 that communicates with the display device 110 and also with other hardware such as the input/output device(s) 108 to present a development environment (e.g., integrated development environment) to the developer 103. The memory 112 can be any type of memory device, such as random access memory, read only or rewritable memory, internal processor caches, and the like. The development module 118 includes computer-executable instructions residing in the memory 112 that are executed by the CPU 104 or the GPU 106 during operation.

Figure 1D:
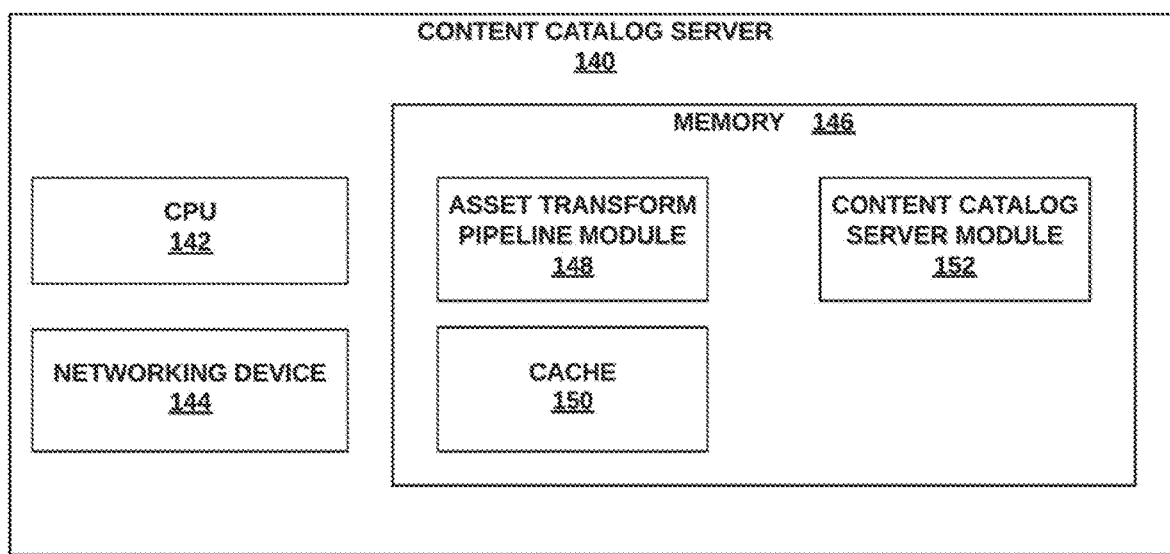
FIG. 1D is a schematic illustrating a content catalog server device within an asset transform and delivering system, in accordance with one embodiment.

In accordance with an embodiment and shown in FIG. 1D is a content catalog server 140. The server 140 includes a CPU 142 and a networking device 144 (e.g., wired or wireless network adapters) for communicating across the network 160. The CPU 142 is any type of processor, processor assembly comprising multiple processing elements (not shown), having access to a memory 146 to retrieve instructions stored thereon, and execute such instructions. Upon execution of such instructions, the instructions implement the processing device 142 to perform a series of tasks as described below in reference to FIG. 2A, FIG. 2B and FIG. 3. The server 140 also includes a memory 146 for storing an asset transform pipeline module 148 that provides various asset transform pipeline functionality as described herein. The asset transform pipeline module 148 includes computer-executable instructions residing in the memory 146 that are executed by the CPU 142 during operation. In accordance with an embodiment, the memory 146 includes a content catalog server module 152 that provides various content catalog server functionality as described herein. The content catalog server module 152 includes computer-executable instructions residing in the memory 146 that are executed by the CPU 142 during operation. Although the content catalog server 140 is shown as a single device in FIG. 1D, it should be understood that the content catalog server 140 can be implemented with a plurality of devices and can be distributed (e.g., as a cloud service).

Figure 2A:
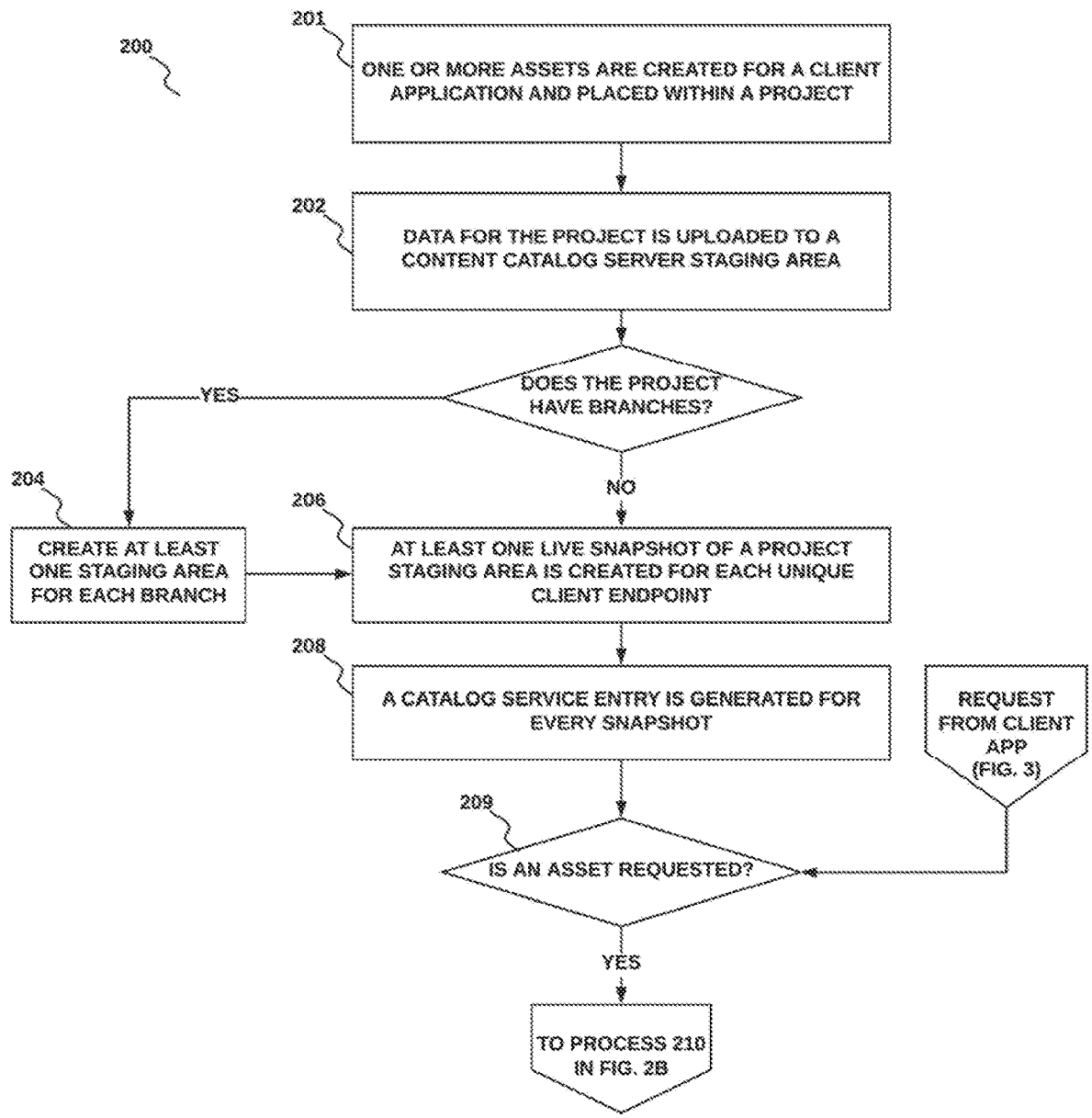
FIG. 2A is a schematic illustrating a flowchart for a method for asset transformation and streaming, in accordance with one embodiment.
Figure 2B:
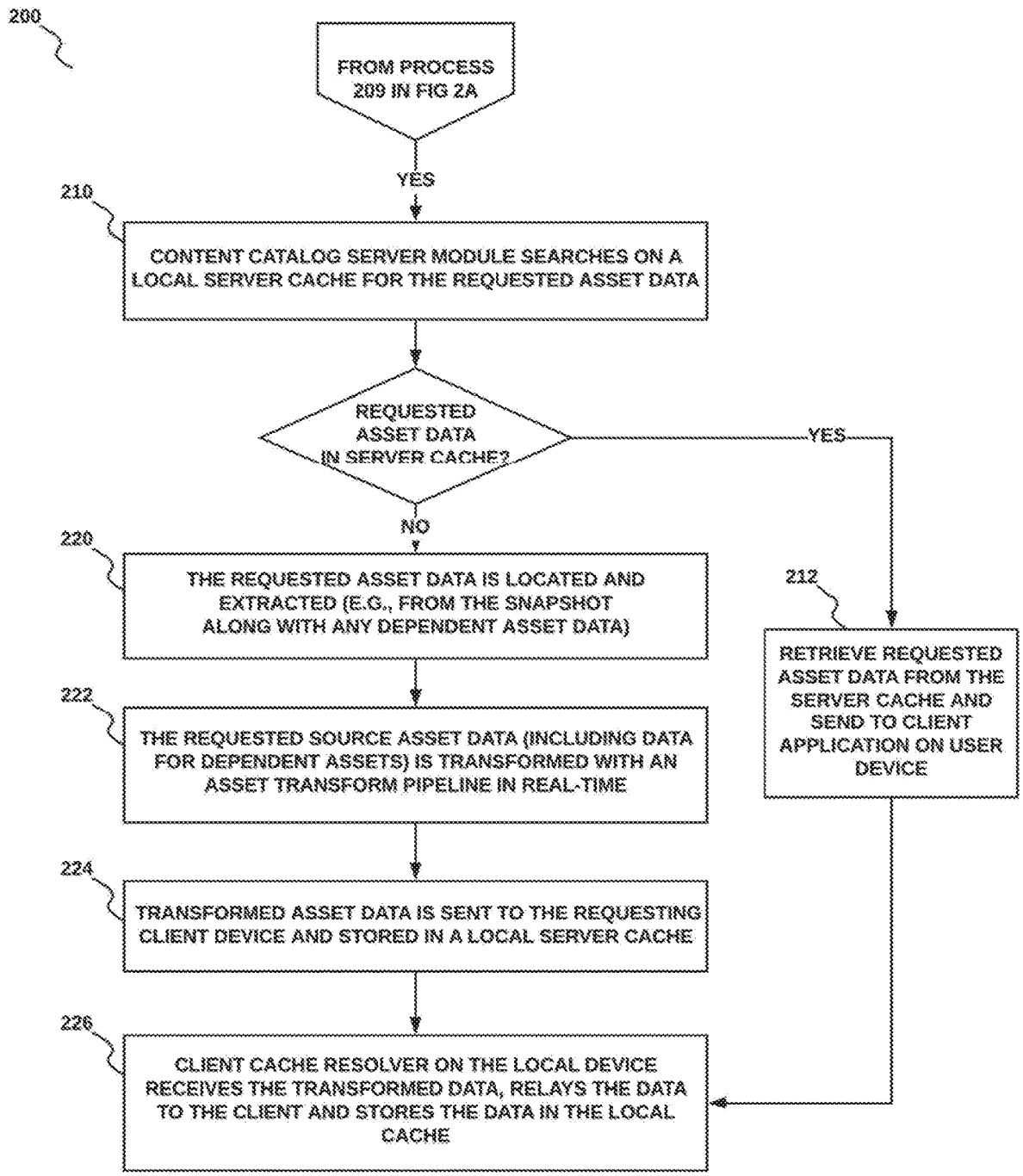
FIG. 2B is a schematic illustrating a flowchart for a method for asset transformation and streaming, in accordance with one embodiment.

In accordance with an embodiment and shown in FIG. 2A and FIG. 2B, is a method 200 for transforming asset source data in the cloud and on demand (e.g., on request) and to communicate the transformed asset source data to one or more application clients. With respect to FIG. 2A, at operation 201 of the method 200, one or more assets are created for use within an application client. The one or more assets being created by a developer 103 (e.g., a creator, a software developer, a designer, a movie producer, and the like). The application client can be any software application that uses digital content, including games, movie projection systems, mobile applications and the like. The assets can represent a digital object within the client application and are described by data which may be stored within a memory and/or within one or more files. The data which describes an asset is referred to herein as source data for the asset, or 'asset source data'. In accordance with an embodiment, the assets may be addressable assets, which include a global unique identification which may be used to identify a specific asset across multiple devices and systems. An addressable asset can also include a label (e.g., friendly name) and content hash. In accordance with an embodiment, for convenience, a collection of source data and files that defines an application client (or a part of the application client) may be organized within a project, which may include a project folder, one or more project files, and the like.

In accordance with an embodiment at operation 202 of the method 200, source data for the project is uploaded to a memory (e.g., a staging area) on the content catalog server 140 in preparation for use by the application client. In accordance with an embodiment, based on a previous version of the project existing on the content catalog server 140, the uploading of the project may be synchronized with the previous version of the project. Based on the project having more than one version control branch, at operation 204, a content catalog server module 152 operating on the content catalog server 140 creates at least one staging area within the memory 146 for each branch of the more than one branch.

In accordance with an embodiment, at operation 206 of the method 200, at least one snapshot of a project staging area is created for each unique application client endpoint (e.g., including each unique application client deployment environment). The snapshot may be a point-in-time representation of all source data within a project (e.g., including all asset data and files). A snapshot allows a state of source data within a project to be visible and accessible at a time specified within the snapshot. In accordance with an embodiment, a snapshot may be immutable (e.g., read-only).

In accordance with an embodiment, at operation 208 of the method 200, a catalog service entry is generated for each snapshot (e.g., each snapshot created during operation 206). The catalog service entry includes data that describes resource locations for source data within the snapshot. The resource locations include physical locations such as content delivery networks (CDNs), remote servers and local memory. The catalog service entry can be made available (e.g., published) to application clients so that it may be used at a runtime for the application client. The catalog service entry can include a unique pointer (e.g., a URL) that points to the source data; for example, there could be a unique pointer for each asset within the catalog service entry. The catalog service entry may also include data describing addressable assets within the project (e.g., an asset unique identification, friendly name/ID, a data hash, an asset resource location), as well as data describing a transform pipeline (e.g., including hash data and transform pipeline input schema data). In accordance with an embodiment, a schema defines data types (e.g., within an asset) that are accepted as input into an asset transform pipeline. In accordance with an embodiment, the catalog service entry may include a list of asset addresses, and for each asset address on the list, an associated current location for the source data (e.g., including files) describing the asset. In accordance with an embodiment, the catalog service entry may include the use of hash functions to further identify source data and detect modifications to the data. For example, a unique asset hash value may be created for an asset by running source data describing the asset through a hash function. Similarly, a unique transform pipeline hash value could be used to identify transform pipelines by running data describing the transform pipeline through a hash function.

In accordance with an embodiment, at operation 209 of the method 200, a request for an asset (e.g., asset source data) is received from an application client 134 on a user device 120. In accordance with an embodiment, a request includes data describing the asset (e.g., data that can be used to find a specific asset, such as a permanent unique identification number, data describing the application client (e.g., data describing a specific application), and data defining an endpoint environment. The data defining the endpoint environment can include data describing a specific user device 120 which sent the request (e.g., a device type, an operating system (OS) wherein the application client is executing, and the like). The request provides information required to find the specific source data that describes the requested asset.

In accordance with another embodiment, a request may also include information on a location (e.g., an address) for an asset. In some embodiments, the location information may point to a fixed location (e.g., a specific database). In other embodiments, the location information may dynamically point to a plurality of locations over time as source data for the requested asset is moved over time (e.g., moved by a creator of the application client). In accordance with the example embodiment, the location information may use the permanent identification as an address to track a location of source data via an asset tracking system. For example, an asset tracking system would allow an application client (e.g., game code) to ping an address for an asset at runtime (e.g., using the method 200) and receive data that resides at the address, without the application client having any information on the location of the asset source data. The asset tracking system would be able to track a location of source asset data in real-time (e.g., as the data is moved) and update the asset resource location within the catalog service entry as needed. The asset tracking system may be implemented within the content catalog server module 152 on the content catalog server 140.

In accordance with an embodiment, the asset transforming and delivering system 100 may include dependency management, whereby at runtime the content catalog server module 152 will additionally find and retrieve asset dependencies for the requested asset without the application client 134 specifying the location of the dependencies. The asset dependencies including additional assets (e.g., assets other than the requested asset) required by the requested asset. For example, the dependencies may include textures and animations for a requested 3D model asset, and asset data for small assets within a larger requested asset.

Referring to FIG. 2B, at operation 210 of the method 200, the content catalog server module 152 searches on a local server cache 150 for the requested asset data. In accordance with an embodiment, the search may involve using an asset data hash value and a transform pipeline hash value to uniquely identify a requested asset within the cache 150 (e.g., to determine whether a cached asset corresponds with the requested asset). In accordance with an embodiment, at operation 212 of the method 200, based on the requested asset data being found in the local server cache 150, the found asset data is retrieved from the cache 150 and sent to the user device 120 (e.g., a specific user device which sent the request). It should be understood that the method 200 should not be limited by operation 210 and operation 212. The method 200 can be performed without performing operation 210 or operation 212.

In accordance with an embodiment, at operation 220 of the method 200, based on the requested asset data not being found in the local server cache 150, the content catalog server module 152 searches the snapshots (e.g., snapshots created during operation 206) for the requested asset data. As part of operation 220, based on the content catalog server module 152 finding the requested asset data in a snapshot, the content catalog server module 152 extracts the requested asset data from within the snapshot.

In accordance with an embodiment, at operation 222 of method 200, the found requested asset data is transformed in real-time with an asset transform pipeline within the content catalog server 140. In accordance with an embodiment, as part of operation 222, data describing dependent assets of the requested asset are also transformed. In accordance with an embodiment, as part of operation 222, a transform pipeline may be prepared such that the prepared transform pipeline includes a set of process steps (e.g., operation steps) which are capable of transforming the found asset data from an original data representation (e.g., source asset data representation) to a final data representation (e.g., an endpoint dependent run-time representation) as specified in the request. In accordance with an embodiment, as part of operation 222, a transform pipeline is selected from a set of predetermined transform pipelines such that the selected transform pipeline is capable of transforming the found asset data from an original data representation (e.g., source asset data representation) to a final data representation (e.g., an endpoint dependent run-time representation) as specified in the request. Also, as part of operation 222 of the method 200, the prepared transform pipeline (or the selected transform pipeline) is applied to the found source asset data in order to convert said data. In accordance with an embodiment, a transform pipeline includes functionality from an asset import and build pipeline. In accordance with an embodiment, an asset transform pipeline is parameterized in order to accept variable metadata input (e.g., mapping to a schema in the asset catalog service entry). In accordance with an embodiment, the asset transform pipeline itself can be configured as an asset that can be stored and reused.

In accordance with an embodiment, at operation 224 of the method 200, the transformed asset data is sent to the user device 120 (e.g., the specific user device 120 which sent the request) and also stored in the server cache 150 by the content catalog server module 152 in order to avoid duplicate transformation (e.g., based on a second identical request from a single device for an asset). In accordance with an embodiment, the server cache 150 can be pre-warmed (e.g., loaded with asset data that has previously been transformed) by executing transform pipelines on available asset data prior to receiving a request.

In accordance with an embodiment, at operation 226 of the method 200, the client cache resolver module 136 on the user device 120 receives the transformed data and relays the data to the application client 134. In accordance with an embodiment, as part of operation 226, the client cache resolver module 136 stores the received data in the user device local cache 138.

In accordance with an embodiment, processes and operations within operation 220, operation 222, and operation 224 of the method 200 are done asynchronously for each asset (e.g., including dependent assets). For example, the locating and extracting within operation 220, the transformation within operation 222, and the sending of data within operation 224 can be done asynchronously for each asset. With asynchronous processing, asset data and asset dependencies can reside anywhere (e.g., on a local server 140, on a remote server or on a CDN) for loading in any order.

Figure 3:
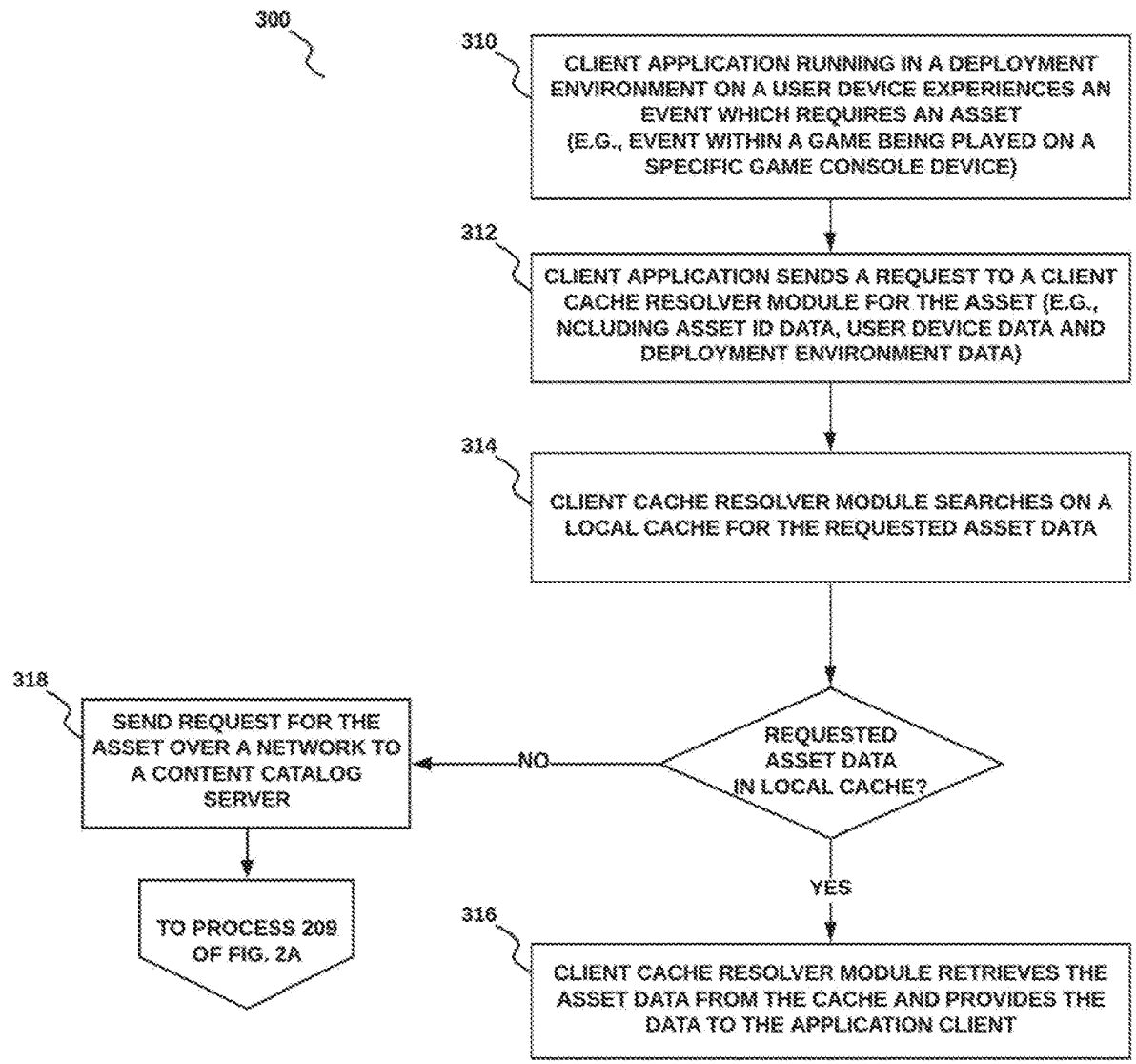
FIG. 3 is a schematic illustrating a flowchart for a method for generating a request for asset transformation and streaming, in accordance with one embodiment.

In accordance with an embodiment and shown in FIG. 3, is a method 300 for generating a request for an asset on a user device 120. At operation 310 of the method 300, an event which requires an asset occurs within an application client 134 running in a deployment environment on the user device 120 (e.g., a game being played on a specific game console device, or a movie being played on a specific movie projection system). The event can include any occurrence in the application client that requires an asset to be used by the application client while the client is running (e.g., accessing a game level within a game which requires additional assets to be requested, displaying content within a mobile application which requires additional assets to be requested in order to create the content, displaying an alternate version of a movie in a movie projection system which requires additional assets to be requested, and the like). In accordance with an embodiment, at operation 312 of the method 300, the client application sends a request for the required asset to the client cache resolver module 136. At operation 314 of the method 300, the client cache resolver module 136 searches on a local cache 138 for the requested asset data. In accordance with an embodiment, the search can involve using an asset data hash and a transform pipeline hash to uniquely identify a requested asset within the cache 138. In accordance with an embodiment, at operation 316 of the method 300, based on the requested asset data being in the user device 120 local cache 138, the client cache resolver module 136 retrieves the found asset data from the cache 138 and relays it to the application client 134. In accordance with an embodiment, at operation 318 of the method 300, based on the requested asset data not being found in the local cache 138 of the user device 120, the client cache resolver module 136 sends a request for the asset over a network 160 to the content catalog server 140 (refer back to operation 209 of FIG. 2A).

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
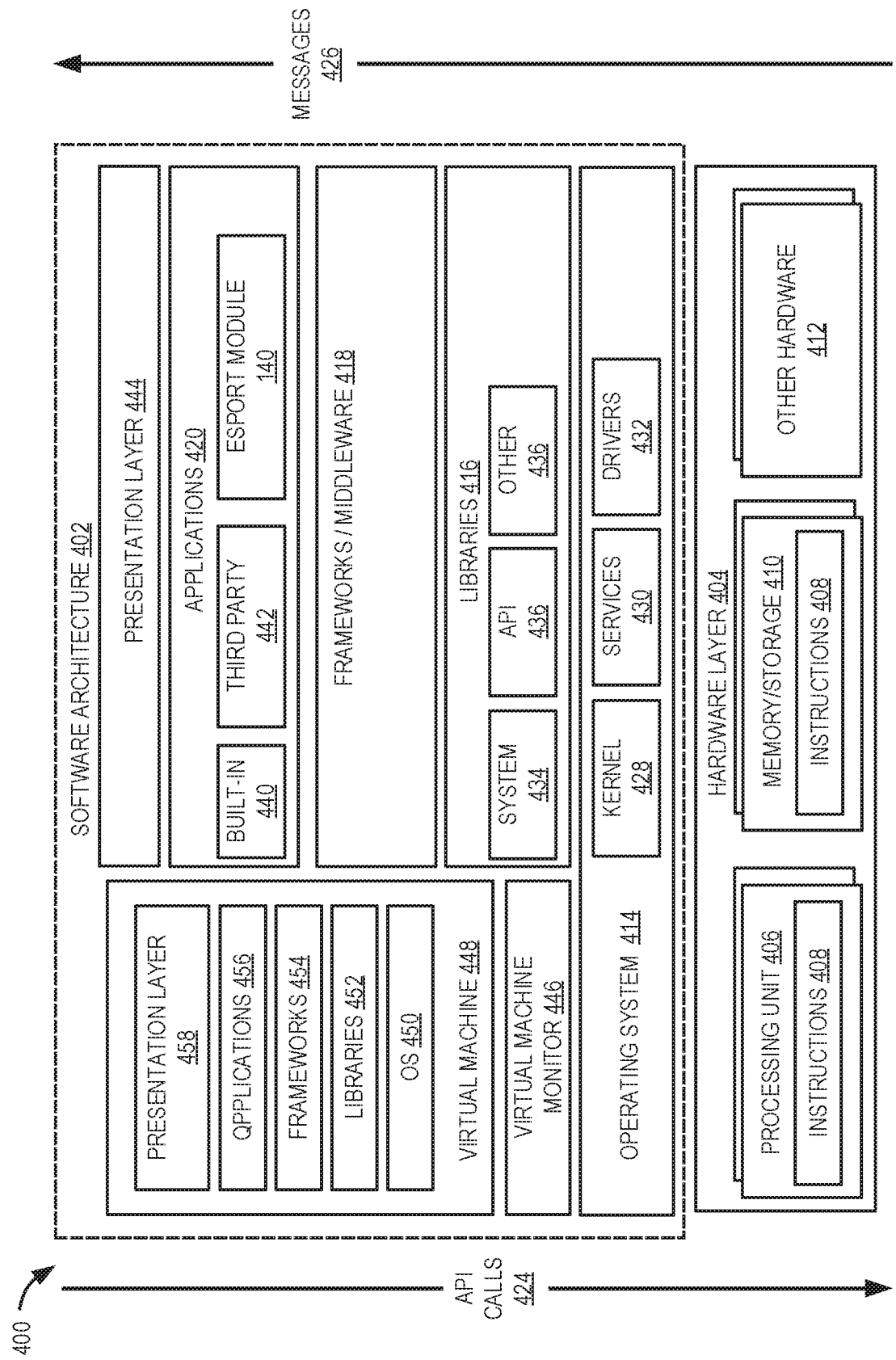
FIG. 4 is a block diagram illustrating an example software architecture, which may be used in conjunction with various hardware architectures described herein.

FIG. 4 is a block diagram illustrating an example software architecture 402, which may be used in conjunction with various hardware architectures herein described. FIG. 4 is a non-limiting example of a software architecture and it will be appreciated that many other architectures may be implemented to facilitate the functionality described herein. The software architecture 402 may execute on hardware such as machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory and/or storage modules shown as memory/storage 410, which also have the executable instructions 408. The hardware layer 404 may also comprise other hardware 412.

In the example architecture of FIG. 4, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than by interfacing directly with the underlying operating system 414 functionality (e.g., kernel 428, services 430, and/or drivers 432). The libraries 416 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be used by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. The third-party applications 442 may include an application developed using the Android™ or iOS™ software development kit (SDK) by an entity other than the vendor of the particular platform, and may be mobile software running on a mobile operating system such as iOS™, Android™, or other mobile operating systems. The third-party applications 442 may invoke the API calls 424 provided by the mobile operating system such as the operating system 414 to facilitate functionality described herein.

The applications 420 may use built-in operating system functions (e.g., kernel 428, services 430, and/or drivers 432), libraries 416, or frameworks/middleware 418 to create user interfaces to interact with users of the system. Alternatively, or additionally, in some systems interactions with a user may occur through a presentation layer, such as the presentation layer 444. In these systems, the application/module "logic" can be separated from the aspects of the application/module that interact with a user.

Some software architectures use virtual machines. In the example of FIG. 4, this is illustrated by a virtual machine 448. The virtual machine 448 creates a software environment where applications/modules can execute as if they were executing on a hardware machine (such as the machine 500 of FIG. 5, for example). The virtual machine 448 is casted by a caster operating system (e.g., operating system 414 in FIG. 4) and typically, although not always, has a virtual machine monitor 446, which manages the operation of the virtual machine 448 as well as the interface with the caster operating system (e.g., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 5:
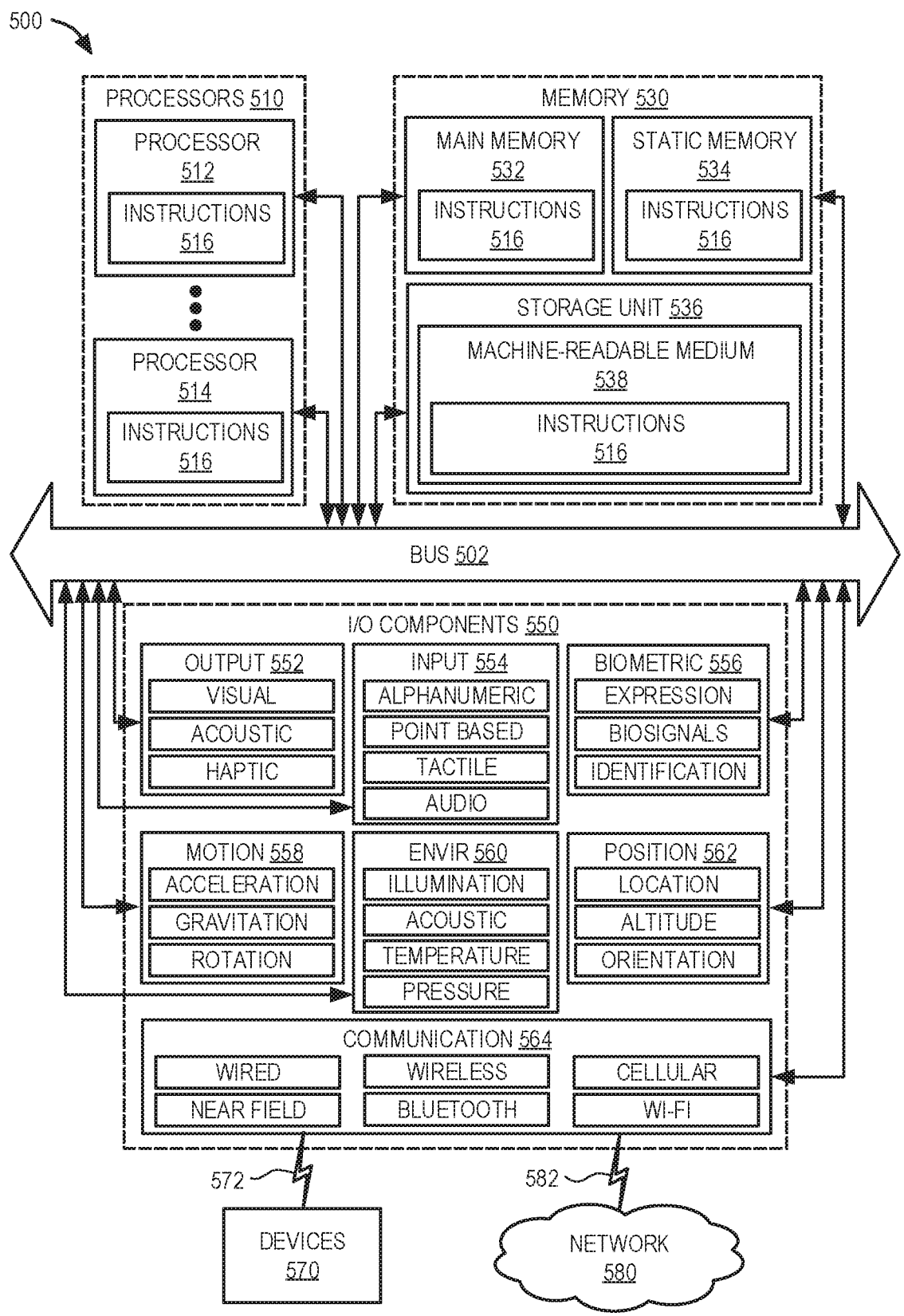
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. As such, the instructions 516 may be used to implement modules or components described herein. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory 530 may include a memory, such as a main memory 532, a static memory 534, or other memory storage, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 5. The input/output (I/O) components 550 are grouped according to functionality merely for simplifying the following discussion and the grouping is in no way limiting. In various example embodiments, the input/output (I/O) components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environment components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental environment components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
one or more server devices communicatively coupled over a network to one or more user devices, one or more processors on the one or more server devices configured to perform operations for transforming and delivering a digital asset, the operations including:
receiving a request from an application client incorporated into a memory on one of the one or more user devices and being executed by the one or more processors, the request including a request for the digital asset, the request including data associated with a data format for the digital asset;
receiving a plurality of snapshots for use by the application client, each snapshot of the plurality of snapshots including data describing a plurality of digital assets. the data being gathered at a moment of time;
storing the plurality of snapshots in a plurality of memories on a plurality of servers of the one or more servers;
locating source data associated with the requested digital asset, the source data describing the digital asset, wherein the locating of the source data includes searching the servers for a snapshot that includes the digital asset and wherein the request may contain a reference to the snapshot;
transforming the source data in substantially real-time, the transforming including modifying the source data into a data format consistent with the data format specified in the request; and
sending the transformed data to the user device for use in the application client.

2. The system of claim 1, wherein the data associated with the data format includes one or more of the following: data identifying the digital asset, data describing the application client, data describing the user device, and data desctibing an operating system wherein the application client is executing.

3. The system of claim 1, wherein transforming the source data in substantially real-time includes modifying the source data according to a transform pipeline incorporated into a memory of the one or more server devices and executed by the one or more processors, the transform pipeline including data describing process steps for modifying the source data into the determined data format.

4. The system of claim 3, wherein the data describing the process steps in the transform pipeline is received over the network from a transform pipeline generator.

5. The system of claim 1, wherein the transformed data is stored in a server cache on the one or more server devices, and wherein the transforming of the source data in substantially real-time includes searching the server cache for previously modified and stored data representing the source data in the determined data format, and based on finding the searched data, sending the found data to the user device for use in the application client.

6. The system of claim 1, wherein the application client performs only display related functions, and a server memory within the one or more server devices includes a second application associated with the application client, and wherein the second application performs the following operations:
generating the request;
receiving the transformed data;
using the transformed data to generate a display signal;

sending the display signal to the user device for display using the application client.

7. The system of claim 1, wherein the request for a digital asset is generated by the application client in response to an event which occurs during the execution of the application client.

8. A non-transitory computer-readable storage medium storing a set of instructions that, when executed by one or more processors, cause the one or more processors to perform operations for transforming and delivering a digital asset, the operations including:

receiving a request from an application client incorporated into a memory on one of the one or more user devices and being executed by the one or more processors, the request including a request for the digital asset, the request including data associated with a data format for the digital asset;

receiving a plurality of snapshots for use by the application client, each snapshot of the plurality of snapshots including data describing a plurality of digital assets, the data being gathered at a moment of time;

storing the plurality of snapshots in a plurality of memories on a plurality of servers of the one or more servers;

locating source data associated with the requested digital asset, the source data describing the digital asset, wherein the locating of the source data includes searching the servers for a snapshot that includes the digital asset and wherein the request may contain a reference to the snapshot;

locating source data associated with the requested digital asset, the source data describing the digital asset;

transforming the source data in substantially real-time, the transforming including modifying the source data into a data format consistent with the data format specified in the request; and sending the transformed data to the user device for use in the application client.

9. The non-transitory machine readable storage medium of claim 8, wherein the data associated with the data format includes one or more of the following: data identifying the digital asset, data describing the application client, data describing the user device, and data describing an operating system wherein the application client is executing.

10. The non-transitory machine readable storage medium of claim 8, wherein transforming the source data in substantially real-time includes modifying the source data according to a transform pipeline incorporated into a memory of the one or more server devices and executed by the one or more processors, the transform pipeline including data describing process steps for modifying the source data into the determined data format.

11. The non-transitory machine readable storage medium of claim 10, wherein the data describing the process steps in the transform pipeline is received over the network from a transform pipeline generator.

12. The non-transitory machine readable storage medium of claim 8, wherein the transformed data is stored in a server cache on the one or more server devices, and wherein the transforming of the source data in substantially real-time includes searching the server cache for previously modified and stored data representing the source data in the determined data format, and based on finding the searched data, sending the found data to the user device for use in the application client.

13. The non-transitory machine readable storage medium of claim 8, wherein the application client performs only display related functions, and a server memory within the one or more server devices includes a second application associated with the application client, and wherein the second application performs the following operations:

generating the request;

receiving the transformed data;

using the transformed data to generate a display signal;

sending the display signal to the user device for display using the application client.

14. The non-transitory machine readable storage medium of claim 8, wherein the request for a digital asset is generated by the application client in response to an event which occurs during the execution of the application client.

15. A computer-implemented method for performing operations for transforming and delivering a digital asset, the operations including:

receiving a request from an application client incorporated into a memory on one of the one or more user devices and being executed by the one or more processors, the request including a request for the digital asset, the request including data associated with a data format for the digital asset;

receiving a plurality of snapshots for use by the application client, each snapshot of the plurality of snapshots including data describing a plurality of digital assets, the data being gathered at a moment of time;

storing the plurality of snapshots in a plurality of memories on a plurality of servers of the one or more servers;

locating source data associated with the requested digital asset, the source data describing the digital asset, wherein the locating of the source data includes searching the servers for a snapshot that includes the digital asset and wherein the request may contain a reference to the snapshot;

locating source data associated with the requested digital asset, the source data describing the digital asset;

transforming the source data in substantially real-time, the transforming including modifying the source data into a data format consistent with the data format specified in the request; and sending the transformed data to the user device for use in the application client.

16. The computer-implemented method of claim 15, wherein the data associated with the data format includes one or more of the following: data identifying the digital asset, data describing the application client, data describing the user device, and data describing an operating system wherein the application client is executing.

17. The computer-implemented method of claim 15, wherein transforming the source data in substantially real-time includes modifying the source data according to a transform pipeline incorporated into a memory of the one or more server devices and executed by the one or more processors, the transform pipeline including data describing process steps for modifying the source data into the determined data format.

18. The computer-implemented method of claim 15, wherein the application client performs only display related functions, and a server memory within the one or more server devices includes a second application associated with the application client, and wherein the second application performs the following operations:

generating the request;
receiving the transformed data;
using the transformed data to generate a display signal;
sending the display signal to the user device for display using the application client.

* * * * *